United States Patent [19]
Metzger

[11] Patent Number: 5,860,505
[45] Date of Patent: Jan. 19, 1999

[54] DEVICE FOR CONTROLLING AN OBJECT ON A CONVEYOR BELT

[75] Inventor: Manfred Metzger, Rammingen, Germany

[73] Assignee: Grob-Werke GmbH & Co. KG, Mindelheim, Germany

[21] Appl. No.: 755,643

[22] Filed: Nov. 25, 1996

[30] Foreign Application Priority Data

Nov. 24, 1995 [DE] Germany .................. 195 43 797.7

[51] Int. Cl.[6] .......................... B65B 37/00; B65G 37/00; B65G 29/00; B65G 15/64
[52] U.S. Cl. .................... 198/463.4; 198/345.3; 198/463.6; 198/345.1; 198/463.4
[58] Field of Search ............. 198/345.3, 345.1, 198/463.4, 463.6

[56] References Cited

U.S. PATENT DOCUMENTS

| | | | |
|---|---|---|---|
| 3,604,554 | 9/1971 | Martz .................................. | 198/463.6 |
| 3,696,756 | 10/1972 | Elmore et al. ...................... | 198/345.3 |
| 4,256,221 | 3/1981 | Lain ..................................... | 198/345.3 |
| 4,610,207 | 9/1986 | Uttscheid ............................ | 198/345.3 |
| 4,646,909 | 3/1987 | Vom Stein .......................... | 198/463.4 |
| 4,703,843 | 11/1987 | Dixon ................................. | 198/463.4 |
| 5,154,277 | 10/1992 | Murakami .......................... | 198/463.6 |
| 5,168,976 | 12/1992 | Kettelson ............................ | 198/345.1 |
| 5,211,276 | 5/1993 | Clopton .............................. | 198/345.3 |

Primary Examiner—William E. Terrell
Assistant Examiner—Joe Dillon, Jr.
Attorney, Agent, or Firm—Jacobson, Price, Holman & Stern, PLLC

[57] ABSTRACT

A device (1) for stopping pallets (5) on a conveyor system independently of the movement of the conveyor means (11). The device (1) comprises a stop (2) which is moved into, and out of, the path of movement of the pallets (5) by means of an electromagnetic actuator (4).

21 Claims, 4 Drawing Sheets

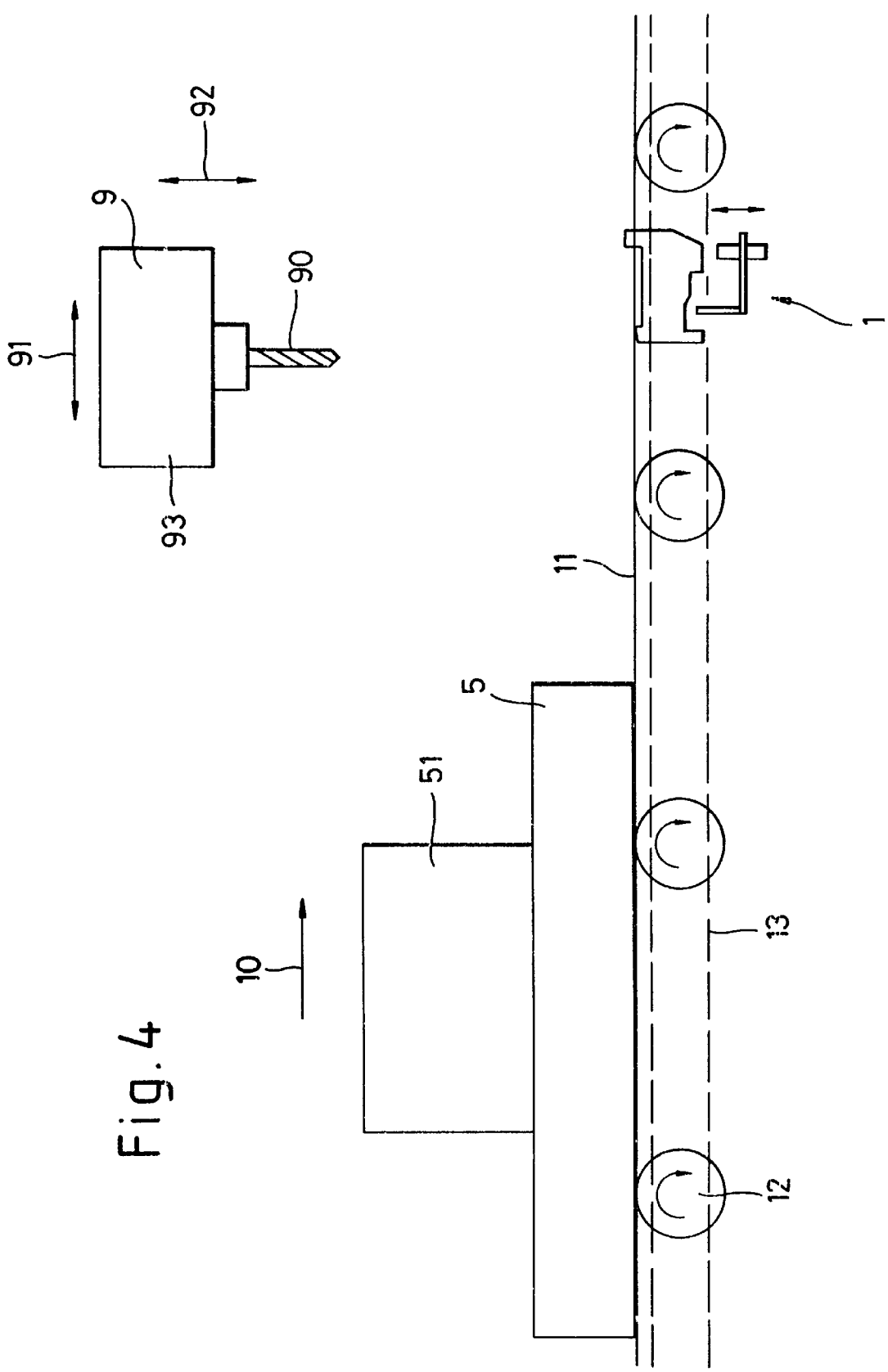

DEVICE FOR CONTROLLING AN OBJECT ON A CONVEYOR BELT

TECHNICAL FIELD

The invention relates to a device for controlling an object (such as a pallet) on a conveyor belt, the device having a stop which can be moved in and/or out of the conveyor belt by a power source and which engages and/or releases the pallet.

BACKGROUND ART

In transfer lines, a plurality of machine toots are connected together by one or more conveyor belts. The workpieces to be machined are conveyed between the machine tools on the conveyor belt on pallets, trucks or the like. These pallets have to be stopped at certain points in order to feed the workpieces, for example to a special machine tool. It is known in this connection to use stops which project in a controllable manner into the path of the pallets, The friction roller chains or other drive means are not stopped, but slide through under the pallets and thus convey other pallets which have not been stopped. As the pallets generally continue to be driven, for example, by friction roller chains, these pallets press against the stops with a certain force. In order to remove the stops from the conveying path, it is necessary to use means which generate sufficient tensile force to free the stop from the force of the conveyor acting on the stop. It is known to use hydraulic or pneumatic arrangements in this connection, controlled, for example, by an electrovalve, The use of servo means of this kind to operate the stops, in particular to remove the stops, is complicated and requires a hydraulic or pneumatic line laid at each stopping point. A control line is simultaneously required to control the stop.

The aim of the invention is to provide an arrangement which operates in the same manner as reliably as the known devices, but without using known servo means or hydraulic or pneumatic means.

DISCLOSURE OF INVENTION

In order to solve this problem, the invention provides for improving a device as described at the outset in that a directly controlled electromagnet is provided as the power source and acts on the stop by means of a lever.

A separate control line is furthermore required to control the stop. This control line can be, for example, part of an electronic bus system, or the electromagnet may be connected by a separate line in the control means, The control line may provide the current for activating the electromagnet, or a power supply line may be provided in addition to the control line, actuating the electromagnet by means of an appropriate circuit if necessary.

The electric line is laid at the same time as the control line. If the electromagnet has the appropriate dimensions, a separate control line can be dispensed with, The current for activating the electromagnet may be drawn from the control means. Special control means with an appropriate current intensity are known in this connection. The use of a lever means that the direction of action of the power source can be changed and the lever can generate a higher force in accordance with the lever principle. The solution according to the invention ensures that the installation of known hydraulic or pneumatic servo means can be dispensed with. The device according to the invention therefore considerably reduces the production costs of the conveyor system.

It is proposed according to the invention that the stop is guided by a guideway. The use of a guideway means that the stop can follow a fixed path of motion in order to release the pallet. In particular, it is provided in this connection that the stop can be moved out of the conveyor means by the guideway, for example, by lowering the stop.

It is particularly advantageous for the device to have a shock absorber in order to compensate for the kinetic energy of the pallet and for the stop to act on the shock absorber. For example, the device may consist of a stop movably mounted on a fixed holder. In this case, the holder carries the shock absorber. The movably arranged stop is engaged by the pallet. The shock absorber is arranged between the stop and the holder and absorbs the kinetic energy of the pallet when the pallet contacts the stop. The pallet stopped in this manner no longer hits the stop hard, thereby preventing possible damage to or displacement of the workpiece.

A gas shock absorber can be used as the shock absorber. The kinetic energy is expended by heating the gas. A tensioning element, for example, a spring, is also provided, this element being tensioned by the force exerted by the pallet when it engages the stop and then serving as a return element or the like. A return element can ensure that the stop is moved back into a defined normal position once the pallet has been released from the stop.

It is advantageous for the stop to project through the conveyor belt into the path of movement of the pallet when the stop is in the normal position, and for the electromagnet to move the stop out of the conveyor means to and release the pallet. It is provided that the maximum travel of the spring system of the shock absorber is provided in the normal position. Essentially each pallet is stopped by the stop in the normal position. This is advantageous as it means that there can be no undesired conveying movements of the pallet. Upon actuation of the electromagnet, the stop is then moved, for example, downwards out of the path of movement of the pallet in order thus to release it.

However, it is also possible to select the normal position such that the pallet is not secured by the stop and the electromagnet pivots the stop into the conveyor means when current is applied and then stops the pallet.

In a preferred embodiment of the invention, the electromagnet acts on a lever which has a cam follower which engages a cam surface on the stop and pushes the stop downwards to the release position. A design of this kind means that the linear movement of the electromagnet can be converted by simple means into a combined longitudinal displacement/pivotal movement. The lever is driven by the linear movement of the electomagnet. The cam follower provided on the lever moves in a guideway on the stop and ensures that the stop is moved accordingly. It is equally possible for the lever to move the stop out of the holding position, for example, via a link.

It is furthermore advantageous for the stop to be mounted in a holder and to have two guideways for the movement of the stop, a first guideway being provided for movement in the conveying direction of the conveyor means and a second guideway being provided for the up and down movements for holding/releasing the pallet. The use of guideways engaged by appropriate spigots on the holder. In this way the stop can execute precisely defined movements. Other guide elements can of course also be used. The stop is movable in two directions, i.e. in the direction of the movement of the conveyor means and perpendicularly thereto. In particular, the stop can be pivoted about an axis to release the pallet. In this connection, the spigot on the holder which engages a guideway serves as an axis about which the stop can pivot. The other guideway is designed to allow the stop to move vertically in relation to the holder. Both longitudinal displacement of the stop and a pivotal or vertical movement of the stop are possible by superimposing the functions of the various guideways.

It is very advantageous for a return element to move the stop back into the normal position once the pallet has been released. The normal position is in this case defined in such a manner that, for example, the stop projects though the conveyor belt into the path of the pallet and stops an incoming pallet. Another possibility consists in that the return element brings the stop back into a position in which an incoming pallet is not stopped. The movement of the electromagnet then ensures, e,g. that the stop is moved into the conveyor belt.

It is advantageous in this connection for the shock absorber to serve as the return element. The shock absorber is provided in order to absorb the kinetic energy of the pallet which runs on to the stop. This kinetic energy can tension, e.g. a spring in the shock absorber, this spring being released when the stop releases the pallet and then moving the stop back into the normal position.

It can be provided in this connection that the return movement of the stop is assisted by the return element and an appropriate design of the guideway.

It is furthermore provided that the device has a return lever which cooperates with the incoming pallet and moves the stop into the conveyor belt. This return lever is provided as a special embodiment of the return element. The return lever is provided, e.g. in front of the stop stopping the pallet in the conveying direction. The use of the return lever results in reliable operation of the device as the return lever is first actuated by the incoming pallet and moves the stop into the conveyor belt. This ensures that the stop always secures the incoming pallet.

It is particularly advantageous for the return lever to be provided on the stop and to have a retaining edge. The stop is mounted to pivot, e.g. with the aid of the guideway. The retaining edge is first pushed downwards by the incoming pallet. The stop, which is pivotably held in the guideway, e.g. by the control element, effects rotational movement of the stop. This ensures that the region of the stop moves into the conveyor belt and the incoming pallet is secured.

BRIEF DESCRIPTION OF THE DRAWINGS

The invention will now be described, by way of example only, and with reference to the accompanying drawings, in which:

FIG. 4 is a side view showing the diagrammatic arrangement of a conveyor system incorporating a device according to the invention.

BEST MODE FOR CARRYING OUT THE INVENTION

Figure 1:
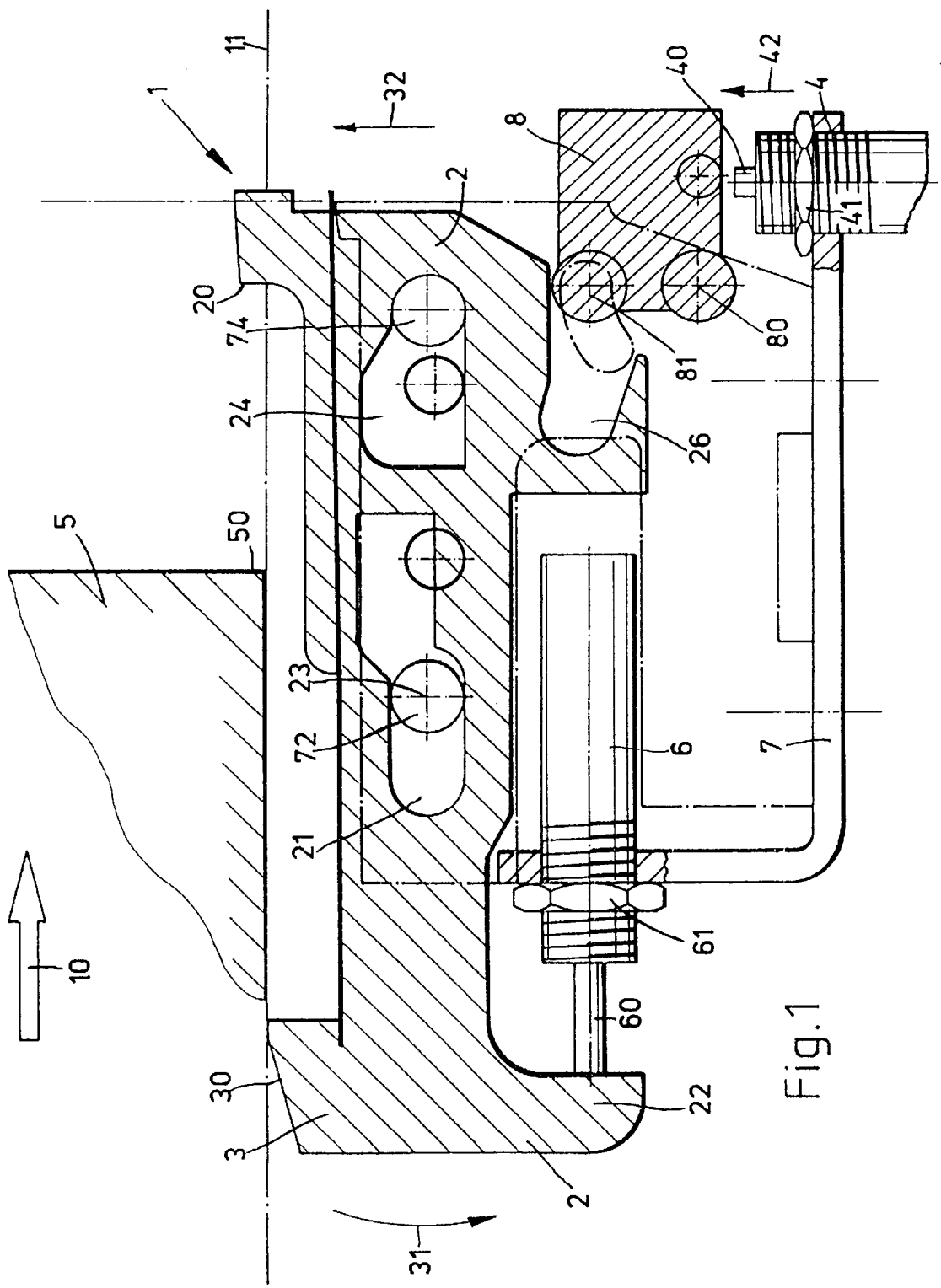
FIG. 1 is a vertical section showing the normal position of the device according to the invention.

Referring to FIG. 4 means 11 comprises a plurality of driven rollers 12, these rollers being connected to one another, for example, by an appropriate chain or belt drive 13 and rotating in the same direction. The conveying motion is towards the right (in accordance with the arrow 10) by rotation of the rollers 12 in the clockwise direction.

An object such as for example a pallet 5 which receives the workpiece 51 to be machined, (for example, an engine block or the like) is situated on the rollers 12. The pallet 5 with the workpiece 51 to be machined, is advanced on the conveyor means 11 to appropriate machining units 9, The device 1 can perform a plurality of different tasks. Firstly, the device 1 can stop the pallet 5 and the machine tool 9 can carry out the machining steps on the workpiece 51 on the secured pallet 5. However, the device 1 can also be used to move the pallet 5 from the conveyor means 11 to an appropriate machining site, where machining is then effected by the machining unit 9. The machining unit 9 is, in this case, a multi-axis machine. The possible movements are indicated here by the double arrows 91 and 92 (horizontally and vertically), The machining unit has the usual known machine tools, e.g. a drill 90. An appropriate positioning drive 93 is provided for precise positioning of the machining unit 9 in relation to the workpiece, allowing for the movements about several axes described hereinbefore.

FIG. 1 shows the normal position of the device 1 according to the invention in cooperation with a pallet 5. The incoming pallet 5 is secured by the stop holder 20 of the stop 2. An endless chain or belt drive 13 is provided to drive the pallet 5 on the conveyor means 11 in a conveyed direction shown by the arrow 10. The stop 2 only stops one pallet 5, while the conveyor means 11 continues to convey further pallets in the conveying direction 10, so that the stop 2 does not affect the rest of the conveying movement of the conveyor means 11.

In the normal position of the device 1 according to the invention shown in FIG. 1, it is provided that the stop holder 20 projects through the conveyor means 11 into the path of the movement of the pallet 5. The stop 2 is movably arranged on a holder 7. The holder 7 has two spigots 72 and 74 which engage guideways 21 and 24 of the stop 2, The guideways 21 and 24 allow the stop 2 to move in the conveying direction 10. The guideways to this end extend in the conveying direction 10.

The second guideway 24 is shaped like a grand piano. This means that one end, that is the end of the guideway directed towards the stop holder 20, can only receive the spigot 74 and no vertical movement of the guideway 24 relative to the spigot 74 is possible. The opposite end of the guideway 24, on the other hand, is designed in such a manner that vertical movement of the stop 2 in relation to the holder 7 is possible. The two guideways 21 and 24 shown allow the stop 2 to move in two dimensions. By virtue of the longitudinal displaceability of the stop in relation to the holder 7, the stop 2 can absorb the kinetic energy of the pallet 5 and transfer it to a shock absorber 6. To this end, the stop 2 has an arm 22 which acts on the piston rod 60 of a shock absorber 6. The arm 22 is not rigidly connected to the piston rod 60. For ideal absorption of the kinetic energy of the incoming pallet 5, the shock absorber 6 is arranged parallel to the conveying direction 10 of the incoming pallet 5. The shock absorber 6 is secured in the holder 7 by a nut 61. Longitudinal adjustability of the shock absorber can thus simultaneously be provided.

The holder 7 is provided, for example, on a strut or holder of the conveyor belt 11 and holds the stop 2 in the region of the conveyor belt 11. The holder 7 also receives the electromagnet 4. In this connection, the electromagnet 4 also has a nut 41 by means of which the magnet 4 can be adjusted in relation to the stop 2. The electromagnet 4 acts on the lever 8 via its armature bar 40. The direction of action of the electromagnet 4 is in this case vertical. Alternatively, the armature bar 40 may be moved vertically by a direct controlled motor driven actuator 43. This vertical movement 42 of the armature bar 40 is deflected by the lever 8. The lever 8 can rotate about an axis of rotation 80. The direction of movement 10 of the pallet 5, the direction of action of the electromagnet 4, and the axis of rotation 80 of the lever 8, form an orthogonal system. The lever 8 has a cam follower 81 which engages a corresponding cam surface 27 defined by the lower edge of a recess 26 in the stop 2, and acts on the stop 2, in particular in the release position shown in FIG. 3. FIG. 1 shows the normal position of the device 1. The shock absorber 6 is released, i.e. the piston rod 60 is pulled out of the shock absorber 6 to the maximum extent. The stop 2 is again situated at the left limit of movement in relation to the holder 7 and in particular relative to the spigots 72 and 74, The first guideway 21 provides for the longitudinal movability of the stop 2 and the second guideway 24 also provides for vertical movability of the stop. The incoming pallet 5 is stopped by the stop holder 20, as shown in FIG. 1. So that the pallet 5 is not stopped abruptly as a result of a sudden shock, the kinetic energy of the pallet 5 is transferred to the shock absorber 6 via the stop 2.

Figure 2:
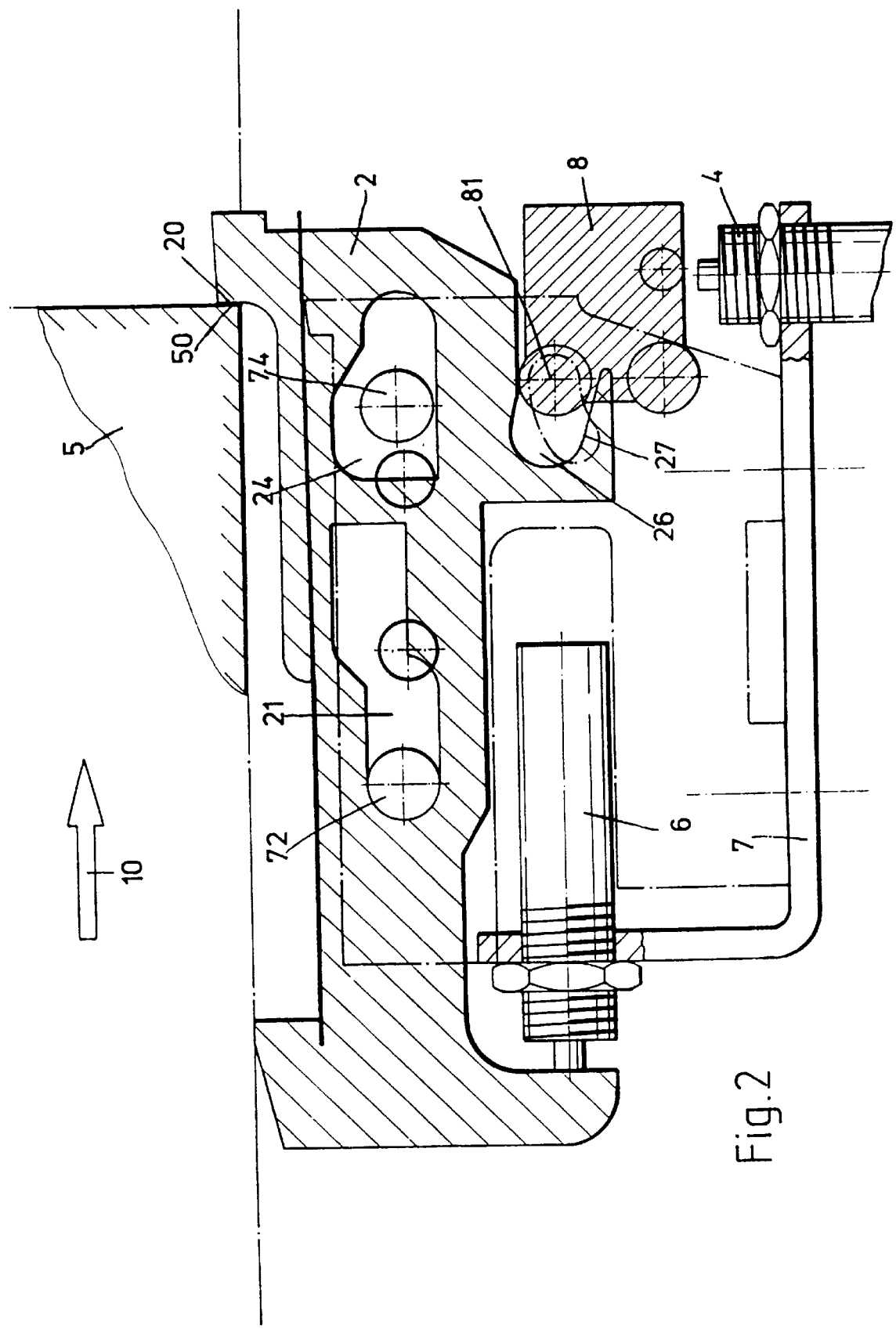
FIG. 2 is a vertical section showing the end position of the stop of the device according to the invention.
Figure 3:
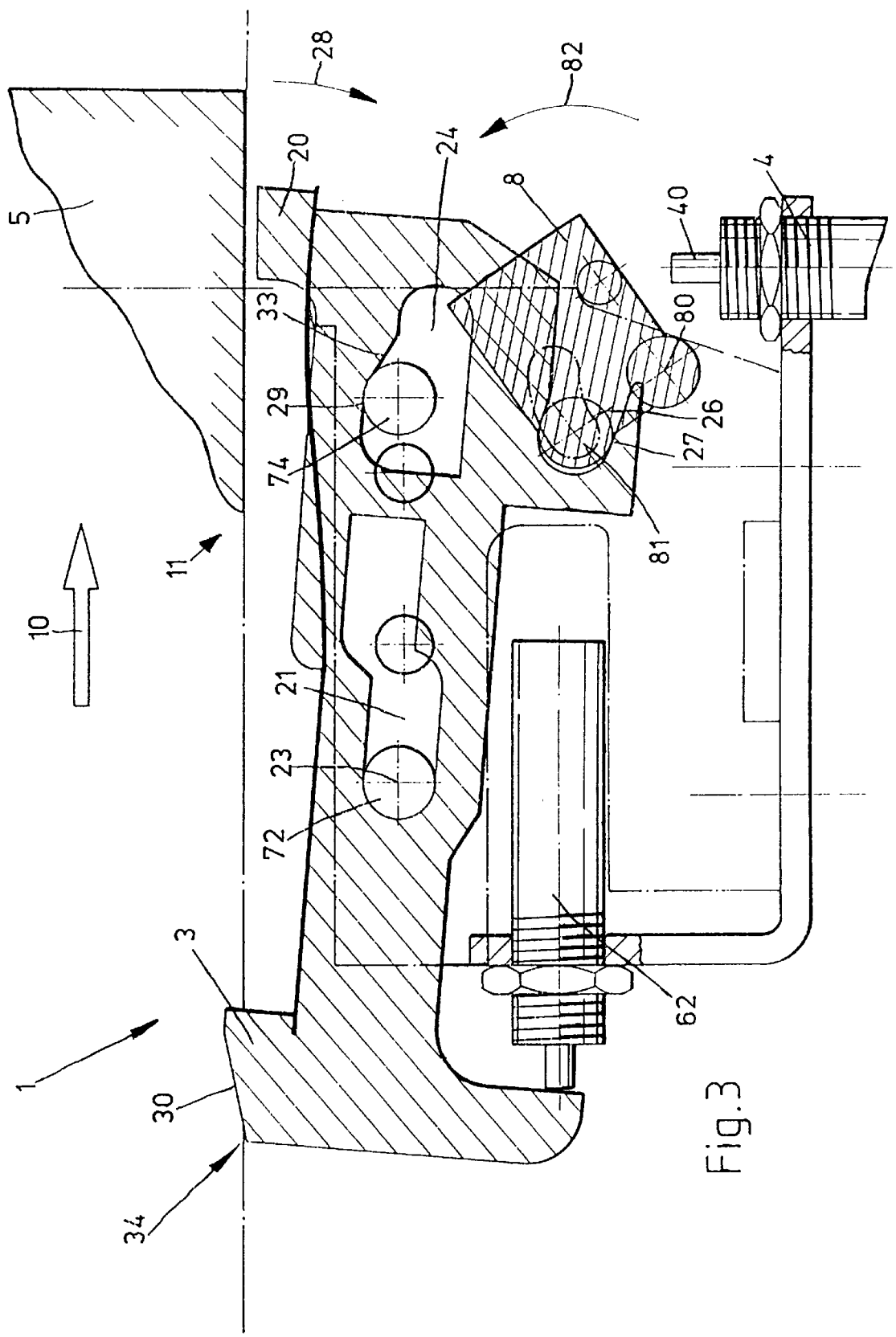
FIG. 3 is a vertical section showing the release position of the device according to the invention.

This is shown in FIG. 2. The end position of the stop shows that the lower front region 50 of the pallet 5 is secured in the conveyor belt 11 by the stop holder 20. The stop 2 is displaced towards the right in relation to the holder 7 in the conveying direction 10. The shock absorber 6 is compressed. The spigot 72 is situated in the first guideway 21 at its left stop point, providing for maximum longitudinal movability of the stop 2. The spigot 74 is situated in the broader region of the guideway 24. The spigot 74 can then move vertically in relation to the second guideway 24. The cam followers 81 of the lever 8 is pressed in the vicinity of the recess 26 in the end position of the stop as shown in to FIG. 2. The cam follower 81 can then act on the stop 2 as a result of rotation of the lever 8. FIG. 3 shows the release position of the pallet 5. In this connection, the stop holder 2 is pivoted out of the conveyor means 11 and no longer prevents the conveying movement of the pallet 5. The pallet 5 is released by applying current to the electromagnet 4. The armature bar 40 extended in his manner moves the lever 8 upwards at the point of application. As the lever 8 is mounted to rotate about the axis of rotation 80, the lever 8 executes a rotational movement according to the arrow 82. The cam follower 81 then completely engages the guideway-like recess 26 in the stop 2, where it acts on the cam surface 27. The stop 2 is pushed downwards by the rotational movement 82 in an anti-clockwise direction. In this situation, the stop 2 is mounted to rotate about the axis of rotation 23. The axis of rotation 23 is in this case formed by the spigot 72 which engages the first guideway 21. The pivotal movement of the stop 2 is indicated by the arrow 28. This pivotal movement 28 is limited by the guideway 24. The maximum pivotal range is then achieved when the spigot 74 is situated in the second guideway 24 in the grand piano-like shape on the upper stop 29 in the region of the broader end of the guideway 24.

It is advantageous in this connection for the pivotal movement which moves the stop holder 20 downwards to be effected about the axis 23 situated at the bottom of, and in particular below the conveyor means 11, so that a component of motion is also produced in the conveying direction 10. This considerably reduces the friction between the stop holder 20 and the pallet 5.

It may be provided that increased power acts on the lever 8, for example, by means of a pretensioned spring or the like.

A return element 62 is provided to return the stop 2 from the release position into the normal position according to FIG. 1. In the embodiment shown, it is connected to the shook absorber 6. A spring or the like tensioned by the kinetic energy of the incoming pallet 5 can be provided to this end. The return element 62 ensures that the stop 2 is displaced to the left in relation to the holder 7. The right-hand region of the stop 2 is thus lifted with the stop holder 20 as the spigot 74 in the guideway 24 runs along the downwardly sloping edge 33 and thus lifts the stop 2 in this region.

FIG. 3 shows that the left front end of the stop 2 in the conveying direction 10 projects through the conveyor means 11 when the stop 2 is in the release position. So that the end 34 of the stop 2 does not prevent the pivotal movement of the stop 2, the stop 2, has for example, a relatively long longitudinal extent, similar to that of a pallet 5. Alternatively the pallet 5 has a recess on its underside (not shown) in which the left end is accommodated when stopped by the stop so the left end 34 of the stop 2 does not prevent pivotal movement of the stop 2.

The left end 34 serves as a return lever 3. In this connection, rapid movement of the stop 2 out of the release position into the normal position is achieved if, for example, a return element 62 is not provided, or is defective, The return lever 3 therefore serves for reliable operation of the device 1 and ensures that the pallet 5 is stopped in a secure and reliable manner by the device 1.

The return lever 3 has a sloping retaining edge 30 which, as shown in FIG. 3, projects through the conveyor means 11 if a pallet 5 is not stopped by the stop holder 20. An incoming pallet 5 strikes the retaining edge 30 and presses the left end of the stop 2 downwards about the axis of rotation 23 as shown by the arrow 31. This downward movement on the left-hand side 31 becomes an upward movement 32 at the right rear end of the stop 2 in the conveying direction 10. The stop holder 20 is therefore pivoted automatically through the conveyor means 11 by the incoming pallet into the path of the pallet. The pallet 5 then runs against the stop holder 20, as shown in the end position of the stop shown in FIG. 2.

What we claim is:

1. A device for controlling the movement of an object which is carried in a conveyed direction along a predetermined path by a conveyor means, the device comprising a fixed frame, a stop movably mounted on said frame and which is movable to and/or from a first position, where the stop engages the object and stops the movement of the object in the conveyed direction independently of the movement of the conveyor means, to and/or from a second position where the stop disengages the object and allows the object to be moved in the conveyed direction by the conveyor means, a holder provided for holding the stop, said holder being fixed relative to the conveyor means, and said stop being pivotally mounted in the holder for pivotal movement relative thereto to and from the first and second positions, and being mounted in the holder for linear movement in the conveyed direction relative to the holder, the stop having a first guideway extending parallel to the conveyed direction to accommodate movement of the stop in the conveyed direction, and a second guideway shaped and configured to accommodate pivotal movement of the stop to and from the first and second positions, and the holder having spigots which engage the said first and second guideways, a shock absorber mounted on said frame for engagement by the stop when the stop engages the object in the first position, said shock absorber being constructed and arranged so as to absorb kinetic energy expended by the object when the motion of the object in the conveyed direction is stopped by the stop, and an actuator means mounted on said frame and comprising a direct controlled electromagnetic or a direct controlled motor driven actuator which is operable to move the stop to and/or from the first and second positions.

2. A device according to claim 1 wherein one of the spigots constitutes the pivotal axis about which the stop pivots relative to the holder.

3. A device according to claim 1 wherein the actuator means comprises a lever positioned and arranged relative to the stop and the electromagnetic actuator, so that the electromagnetic actuator can operate on the lever to cause the lever to move the stop to the first and second positions.

4. A device according to claim 3 wherein the stop means includes a cam surface and the lever has a cam follower which acts on the cam surface to push the stop to said second position when the lever is moved by the electromagnetic actuator.

5. A device for controlling the movement of an object which is carried in a conveyed direction along a predetermined path by a conveyor means, the device comprising a stop which is movable to and/or from a first position, where the stop engages the object and stops the movement of the object in the conveyed direction independently of the movement of the conveyor means, to and/or from a second position where the stop disengages the object and allows the object to be moved in the conveyed direction by the conveyor means, a holder provided for holding the stop, said holder being fixed relative to the conveyor means, and said stop being pivotally mounted in the holder for pivotal movement relative thereto to and from the first and second positions, and being mounted in the holder for linear movement in the conveyed direction relative to the holder, the stop having a first guideway extending parallel to the conveyed direction to accommodate movement of the stop in the conveyed direction, and a second guideway shaped and configured to accommodate pivotal movement of the stop to and from the first and second positions, and the holder having spigots which engage the said first and second guideways, and an actuator means comprising a direct controlled electromagnetic or a direct controlled motor driven actuator which is operable to move the stop to and/or from the first and second positions.

6. A device according to claim 5, wherein one of the spigots constitutes the pivotal axis about which the stop pivots relative to the holder.

7. A device according to claim 5, wherein the actuator means comprises a lever positioned and arranged relative to the stop and the electromagnetic actuator, so that the electromagnetic actuator can operate on the lever to cause the lever to move the stop to the first and second positions.

8. A device according to claim 7, wherein the stop means includes a cam surface and the lever has a cam follower which acts on the cam surface to push the stop to said second position when the lever is moved by the electromagnetic actuator.

9. A device according to claim 5, wherein a shock absorber is provided against which the stop acts when the stop engages the object, said shock absorber being constructed and arranged so as to absorb kinetic energy expended by the object when the motion of the object in the conveyed direction is stopped by the stop.

10. A device according to claim 9, wherein a return element is provided for biasing the stop to move in the opposite direction to the conveyed direction.

11. A device for controlling the movement of an object which is carried in a conveyed direction along a predetermined path by a conveyor means, the device comprising a stop which is movable to and/or from a first position, where the stop engages the object and stops the movement of the object in the conveyed direction independently of the movement of the conveyor means, to and/or from a second position where the stop disengages the object and allows the object to be moved in the conveyed direction by the conveyor means, a holder provided for holding the stop, said holder being fixed relative to the conveyor means, and said stop being pivotally mounted in the holder for pivotal movement relative thereto to and from the first and second positions, and being mounted in the holder for linear movement in the conveyed direction relative to the holder, a second lever provided which projects into the path of movement of the object in the conveyed direction when said stop is in the second position, and said second lever being positioned and arranged so as to operate on the stop and move the stop to said first position when the second lever is contacted by an object moving in the conveyed direction, and an actuator means comprising a direct controlled electromagnetic or a direct controlled motor driven actuator which is operable to move the stop to and/or from the first and second positions.

12. A device according to claim 11, wherein the second lever is constituted by a projection on the stop.

13. A device according to claim 11, wherein the actuator means comprises a lever positioned and arranged relative to the stop and the electromagnetic actuator, so that the electromagnetic actuator can operate on the lever to cause the lever to move the stop to the first and second positions.

14. A device according to claim 13, wherein the stop means includes a cam surface and the lever has a cam follower which acts on the cam surface to push the stop to said second position when the lever is moved by the electromagnetic actuator.

15. A device according to claim 11, wherein a shock absorber is provided against which the stop acts when the stop engages the object, said shock absorber being constructed and arranged so as to absorb kinetic energy expended by the object when the motion of the object in the conveyed direction is stopped by the stop.

16. A device according to claim 15, wherein a return element is provided for biasing the stop to move in the opposite direction to the conveyed direction.

17. A device for controlling the movement of an object which is carried in a conveyed direction along a predetermined path by a conveyor means, the device comprising a fixed frame, a stop movably mounted on said frame and which is movable to and/or from a first position, where the stop engages the object and stops the movement of the object in the conveyed direction independently of the movement of the conveyor means, to and/or from a second position where the stop disengages the object and allows the object to be moved in the conveyed direction by the conveyor means, a holder provided for holding the stop, said holder being fixed relative to the conveyor means, and said stop being pivotally mounted in the holder for pivotal movement relative thereto to and from the first and second positions, and being mounted in the holder for linear movement in the conveyed direction relative to the holder, a second lever provided which projects into the path of movement of the object in the conveyed direction when said stop is in the second position, and said second lever being positioned and arranged so as to operate on the stop and move the stop to said first position when the second lever is contacted by an object moving in the conveyed direction, a shock absorber mounted on said frame for engagement by the stop when the stop engages the object in the first position, said shock absorber being constructed and arranged so as to absorb kinetic energy expended by the object when the motion of the object in the conveyed direction is stopped by the stop, and an actuator means mounted on said frame and comprising a direct controlled electromagnetic or a direct controlled motor driven actuator which is operable to move the stop to and/or from the first and second positions.

18. A device according to claim 17, wherein a shock absorber is provided against which the stop acts when the stop engages the object, said shock absorber being constructed and arranged so as to absorb kinetic energy expended by the object when the motion of the object in the conveyed direction is stopped by the stop.

19. A device according to claim 17, wherein the second lever is constituted by a projection on the stop.

20. A device according to claim 17, wherein the actuator means comprises a lever positioned and arranged relative to the stop and the electromagnetic actuator, so that the electromagnetic actuator can operate on the lever to cause the lever to move the stop to the first and second positions.

21. A device according to claim 20, wherein the stop means includes a cam surface and the lever has a cam follower which acts on the cam surface to push the stop to said second position when the lever is moved by the electromagnetic actuator.

* * * * *